(12) United States Patent
Bargagni et al.

(10) Patent No.: US 10,346,700 B1
(45) Date of Patent: Jul. 9, 2019

(54) OBJECT RECOGNITION IN AN ADAPTIVE RESOURCE MANAGEMENT SYSTEM

(71) Applicant: Cynny Spa, Florence OT (IT)

(72) Inventors: Stefano Bargagni, Constanta (RO); Mauro Rinaldelli, Sesto Fiorentino (IT); Daniele Tassone, Somma Vesuviana (IT)

(73) Assignee: CYNNY SPA, Florence (IT)

( * ) Notice: Subject to any disclaimer, the term of this patent is extended or adjusted under 35 U.S.C. 154(b) by 115 days.

(21) Appl. No.: 15/471,678

(22) Filed: Mar. 28, 2017

Related U.S. Application Data

(60) Provisional application No. 62/331,366, filed on May 3, 2016.

(51) Int. Cl.
  *G06K 9/00* (2006.01)
  *G06K 9/62* (2006.01)

(52) U.S. Cl.
  CPC ....... *G06K 9/00973* (2013.01); *G06K 9/6267* (2013.01); *G06K 2209/27* (2013.01)

(58) Field of Classification Search
  USPC .................................................. 382/103, 224
  See application file for complete search history.

(56) References Cited

U.S. PATENT DOCUMENTS

| | | | |
|---|---|---|---|
| 6,556,217 B1 | 4/2003 | Makipaa et al. | |
| 10,115,185 B2 * | 10/2018 | Gibbon | G06K 9/00221 |

(Continued)

OTHER PUBLICATIONS

Duan, et al. "Overview of the MPEG-CDVS Standard", IEEE, pp. 179-194. (Year: 2016).*

(Continued)

*Primary Examiner* — Daniel G Mariam
(74) *Attorney, Agent, or Firm* — Hickman Palermo Becker Bingham LLP

(57) ABSTRACT

A digital image processing method including: retrieving by a mobile computing device an object recognition model, where the object recognition model includes one or more object recognition definitions usable to identify within a digital image one or more objects captured by the digital image; receiving a first indication from the mobile computing device that there is a first computer resource available; determining, based on the first computer resource available, that the first computer resource available is sufficient to load a first object recognition definition defined in the object recognition model; loading into the first computer resource the first object recognition definition; analyzing a particular digital image, using the first object recognition definition loaded into the first computer resource, to determine whether a first object defined by the first object recognition definition is captured within the particular digital image; receiving a second indication from the mobile computing device that there is a second computer resource available; determining, based on the second computer resource available, that the second computer resource available is sufficient to load a second object recognition definition defined in the object recognition model; loading into the second computer resource the second object recognition definition; analyzing the particular digital image, using the second object recognition definition loaded into the second computer resource, to determine whether a second object defined by the second object recognition definition is captured within the particular digital image; associating as metadata of the particular digital image that the first object or the second object has been captured within the particular digital image.

20 Claims, 3 Drawing Sheets

(56) References Cited

U.S. PATENT DOCUMENTS

2010/0142821 A1 6/2010 Hosoi
2018/0196587 A1* 7/2018 Bialynicka-Birula ...................... H04N 1/215

OTHER PUBLICATIONS

Mahon, John, "Wrangling Dalvik: Memory Management in Android (part 1 of 2), RaizException—Raizlabs Developer BlogRaizException—Raizlabs Developer Blog" dated Mar. 4, 2014, www.raizlabs.com, 16 pgs.

European Patent Office, "Search Report" in application No. 17168920.1-1901, dated Oct. 17, 2017, 7 pages.

European Claims in application No. 17168920.1-1901, dated Oct. 2017, 4 pages.

Duan, Ling-Yu et al., "Overview of the MPEG-CDVS Standard" IEEE Transactions on Image Processing, IEEE Service Center, vol. 25, No. 1, dated Jan. 1, 2016, 16 pages.

Chen et al., "Memory-Efficient Image Database for Mobile Visual Search", IEEE Multimedia, dated Jan. 1, 2014 vol. 21 No. 1, 10 pages.

* cited by examiner

OBJECT RECOGNITION IN AN ADAPTIVE RESOURCE MANAGEMENT SYSTEM

BENEFIT CLAIM

This application claims the benefit of provisional application 62/331,366, filed May 3, 2016, the entire contents of which are incorporated hereby by reference for all purposes as if fully set forth herein.

TECHNICAL FIELD

The present disclosure generally is in the technical field of computer programs, computer-implemented systems and techniques for machine object recognition and, more specifically, object recognition in digital images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices may store one or more digital images. For example, the digital images may be images taken using a camera of a computing device, such as a smartphone's included camera. However, the computing devices have limited insight as to what the digital images may include. For example, photos may include different persons or various physical items. The computing device may be unable to recognize objects captured within the photos. Therefore, there is a need for a technical process that improves object recognition by computing devices.

SUMMARY OF THE INVENTION

The appended claims may serve as a summary of the invention.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
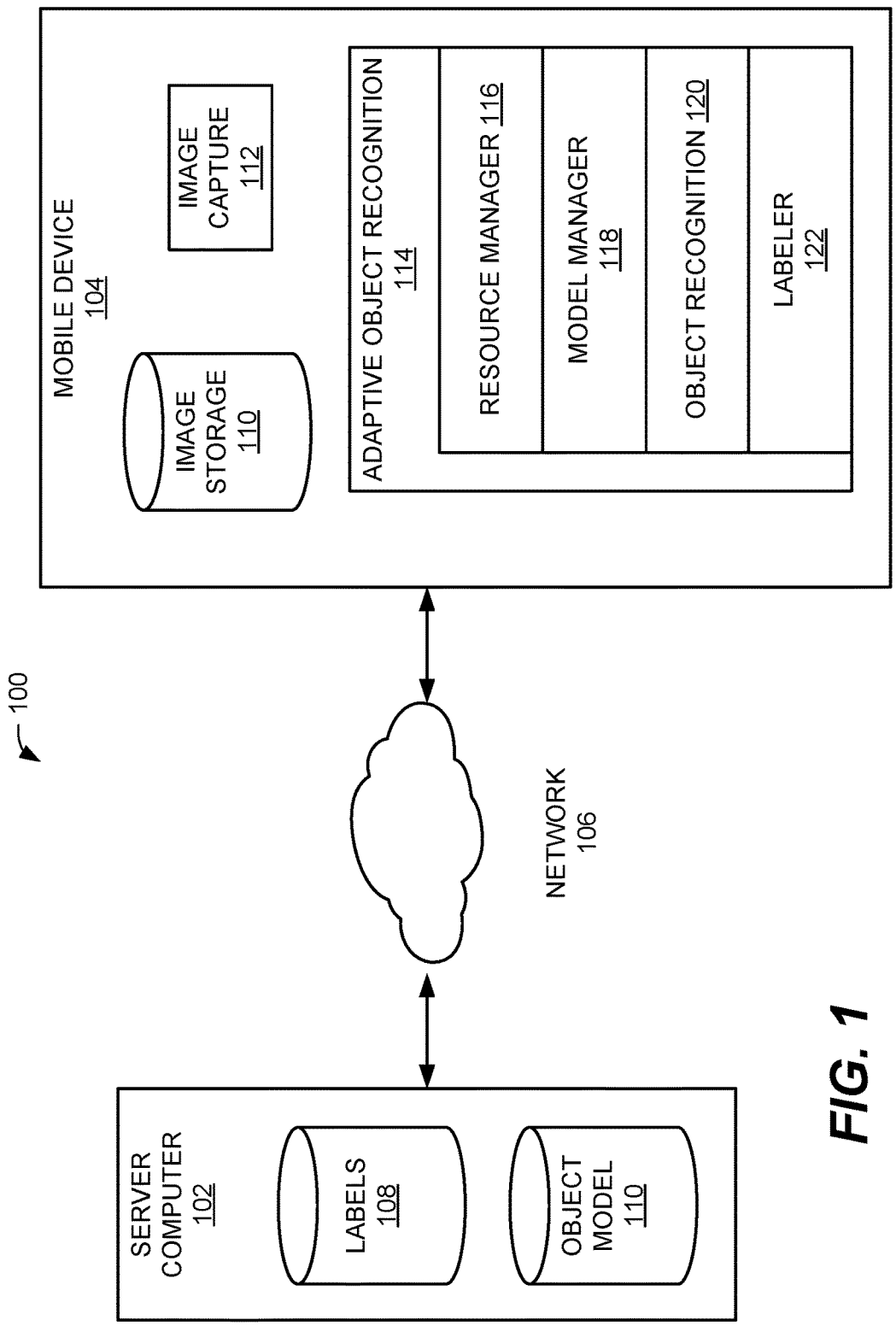
FIG. 1 shows an adaptive object recognition system configured to recognize objects contained in a digital image on a mobile device, according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Headings used in this application are provided merely for reference purposes. Features discussed following each heading do not limit the features as being required by a specific embodiment identified by each heading and do not limit the features as solely belonging to any specific embodiment identified by each heading.

1. General Overview

Digital images may be stored on a computing device, such as a smartphone or other mobile device. The digital images may be analyzed by the computing device to determine one or more objects captured by the digital images. In an embodiment, a digital image is analyzed by a predictor component of a computing device (e.g., a mobile device).

In an embodiment, a computing device may use a model, such as an object recognition model, in order to recognize an object within the digital image. The object recognition model is compressed before being in memory of the computing device. An adaptive object recognition system is used to load one specific piece or object recognition definition of the object recognition model at a time, instead of the entire model. In other words, the object recognition model includes multiple object recognition definitions, so that each object recognition definition is selectively provided for use in image recognition as available resources change on the computing device. As the computing device operates, the predictor component regularly updates in an adaptive way using updated information from the model (e.g., updated as system or network resources available to the computing device change over time). Output data regarding the image is provided based on results from the analyzing (e.g., provided over a network to a server). The image is therefore processed and the objects contained are recognized. The objects are optionally, for example, listed in the output data.

In an embodiment, a digital image processing method includes digital instructions executing on a mobile computing device. The method includes retrieving an object recognition model. The object recognition model includes one or more object recognition definitions usable to identify within a digital image one or more objects captured by the digital image. For example, the object recognition model includes information useable by the mobile computing device to identify whether an object has been captured in a digital image. A first indication is received from the mobile computing device that there is a first computer resource available. Indications of computer resources available may include a computer resource of at least one of memory, processor bandwidth, or input device for user input. The method further includes determining, based on the first computer resource available, that the first computer resource available is sufficient to load a first object recognition definition defined in the object recognition model. The first computer resource available may be insufficient to load a second object recognition definition. Determining that the first computer resource available is sufficient may be performed in response to receiving the first indication. The first object recognition definition is loaded. Using the first object recognition definition loaded into the first computer resource, a particular digital image is analyzed to determine whether a first object defined by the first object recognition definition is captured within the particular digital image. A second indication is received from the mobile computing device that there is a second computer resource available. The method further includes, based on the second computer resource available, determining that the second computer resource available is sufficient to load the second object recognition definition defined in the object recognition model. The second computer resource loads the second object recognition definition. Using the second object recognition definition loaded into the second computer resource, the particular digital image is analyzed to determine whether a second object defined by the second object recognition definition is captured within the particular digital image. Metadata is associated with the particular digital image that the first object or the second object has been captured within the particular digital image.

In various embodiments, the mobile computing device is unable to load all the object recognition definitions included in the object recognition model at a given time. The object recognition model may be compressed before retrieval by the mobile computing device. The object recognition model may be loaded onto memory of the mobile computing device before analyzing the particular digital image. The first indication may be received at a first time and the second indication is received at a second time, after the first time.

In an embodiment, the method may further include transmitting the metadata of the particular digital image to another computing device. The other computing device may store data indicating that an object has been captured within the particular digital image. The object recognition model may include output of a machine learning technique based on object recognition data stored separate from the mobile computing device.

Embodiments of the method may include associating as metadata of the particular digital image that the first object or second object has been captured within the particular digital image.

The disclosure includes methods and apparatuses which perform these methods, including data processing systems which perform these methods, and computer readable media containing instructions which when executed on data processing systems cause the systems to perform these methods.

2. Computer Systems

FIG. 1 is a block diagram of computer systems that may be used in an embodiment.

In the example of FIG. 1, computer systems 100 include a server computer 102 and a mobile device 104, communicatively coupled over a network 106. The mobile device 104 may include an adaptive object recognition system 114 executing on any suitable computing device that allows the processing of digital images. For example, the mobile device 104 may represent a smartphone, cell phone, or other computing device.

The server computer 102 may be implemented on any suitable computing device, different than the computing device represented by the mobile device 104. The server component 102 may include a labels data store 108 and an object models data store 110. The labels data store 108 includes information identifying one or more labels assigned to digital images tracked by the adaptive object recognition system 114. The objects models data store 110 includes one or more object recognition models. The one or more object recognition models may be generated using machine learning techniques. Each object recognition model may be used by the adaptive object recognition system 114 to determine whether an object specified by the object recognition model was captured in a particular digital image.

The mobile device 104 may include an image data store 110 and an image capture component 112. For example, digital images captured by the image capture component 112 may be stored at the image data store 110. However, the image data store may include digital images not captured using the image capture component 112.

Further, the mobile device 104 may include executable instructions that implement the various features of the adaptive object recognition system 114. For example, an object recognition model may be loaded into memory of the mobile device 104 before analyzing whether objects were captured in a particular digital image. Resource manager instructions 116 receives input that specifies an amount or type of resource available to the adaptive object recognition system 114. At different times when the adaptive object recognition system 114 operates, the resources manager instructions 116 may receive one or more indications as to available computing resources. Model manager instructions 118 uses the available computing resources available to determine which pieces, or object recognition definitions, may be loaded.

In an embodiment, the object recognition definitions are provided one-by-one and loaded onto the mobile device 104. For example, the adaptive object recognition system 114 adapts in real-time during operation based on a determination of resources that are available within or to the mobile device 104.

Object recognition instructions 120 applies object recognition definitions loaded by the model manager instructions 118 to determine whether a particular digital image, such as digital images stored in the image data store 110, capture one or more objects defined by the one or more loaded object recognition definitions. Labeler instructions 122 associates labels with identified objects or digital images. The labels may be sent as output data, over a network, to another computing device such as a data repository, the output data including at least one label, each label representing an object that has been recognized as belonging to a digital image. Models may be configured based on the data repository.

3. Example Implementation of an Adaptive Object Recognition System

Figure 2:
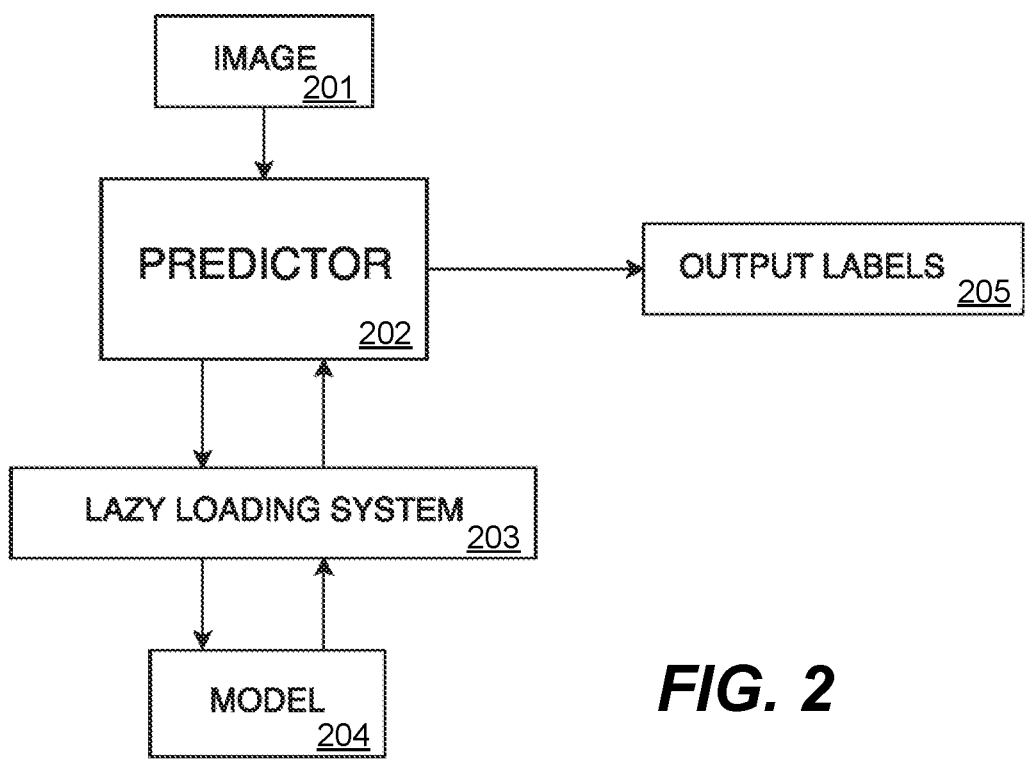
FIG. 2 is a block diagram of example networked computer systems that can be used in one embodiment.

FIG. 2 shows an adaptive object recognition system 114 configured to recognize objects contained in an image on a mobile device, according to one embodiment.

A digital image 202 is processed using a predictor 202. The digital image 202 is, for example, a digital image captured by a camera or other image creation device.

The predictor 202 analyzes the digital image in order to recognize objects contained or captured in the digital image and known to an object recognition model 204. The object recognition model 204 may include object defined in prior training or during configuration of the object recognition model 204. The object recognition model 204 is, for example, a pre-trained model based on a set of known objects that can be recognized.

A lazy-loading system 203 provides the input/output (I/O) from the object recognition model 204 to the predictor 202 in an adaptive way, based on the resources available to the mobile device. The resources include, for example, memory, processor bandwidth, input devices such as cameras, microphones or other sensors, input devices for user input such as a keyboard, pointing device or touch screen, or other.

Output labels 205 is the set of labels representing the objects that have been recognized from the predictor 202 as belonging to the digital image. The output labels 205 may be represented as metadata associated with digital images.

Various non-limiting examples of object recognition that may be used with the above adaptation system are described in U.S Patent Application Publication US 2010/0142821 by Hosoi, published Jun. 10, 2010, and titled "Object Recognition System, Object Recognition Method and Object Recognition Program", which is incorporated by reference herein in its entirety.

Various non-limiting examples of how elements may be properly shown on a device's display that may be used with the above adaptation system are described in U.S. Pat. No.

6,556,217 by Makipaa et al., issued Apr. 29, 2003, and titled "System and Method for Content Adaptation and Pagination Based on Terminal Capabilities", which is incorporated by reference herein in its entirety.

4. Implementation Example—Hardware Overview

The systems and methods disclosed above can be implemented in a computer apparatus in the form of a data processing system.

Figure 3:
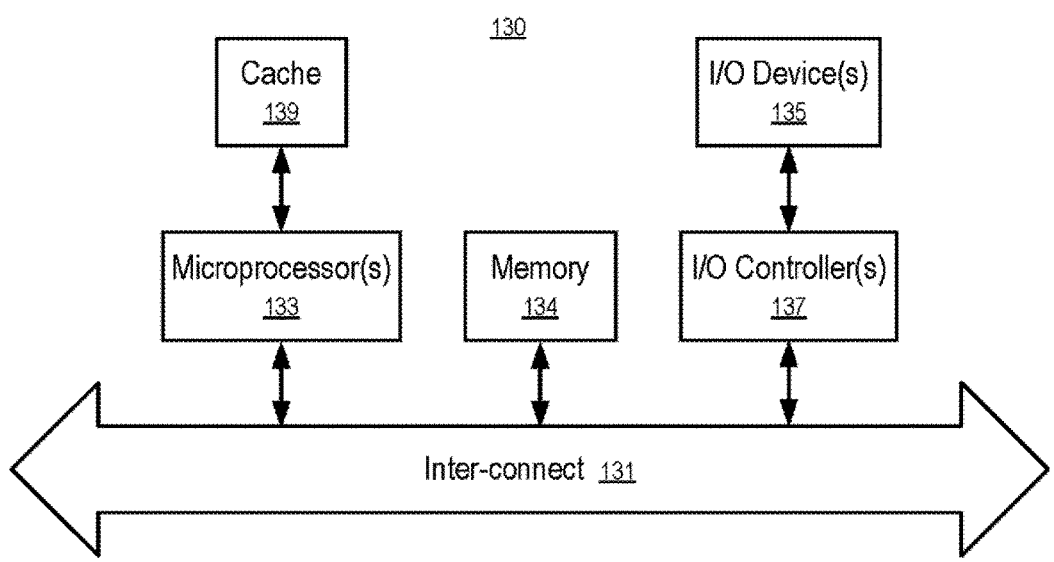
FIG. 3 illustrates a data processing system that can be used for the adaptive object recognition system, according to one embodiment.

FIG. 3 illustrates a data processing system according to one embodiment. While FIG. 3 illustrates various components of a computer system, it is not intended to represent any particular architecture or manner of interconnecting the components. One embodiment may use other systems that have fewer or more components than those shown in FIG. 3. The data processing system can be used in some embodiments to implement the predictor 102 and/or the lazy loading system 103, or all components of the adaptation system above.

In FIG. 3, the data processing system (130) includes an inter-connect (131) (e.g., bus and system core logic), which interconnects one or more microprocessors (133) and memory (134). The microprocessor (133) is coupled to cache memory (139) in the example of FIG. 2.

In one embodiment, the inter-connect (131) interconnects the microprocessor(s) (133) and the memory (134) together and also interconnects them to input/output (I/O) device(s) (135) via I/O controller(s) (137). I/O devices (135) may include a display device and/or peripheral devices, such as mice, keyboards, modems, network interfaces, printers, scanners, video cameras and other devices known in the art. In one embodiment, when the data processing system is a server system, some of the I/O devices (135), such as touch screens, printers, scanners, mice, and/or keyboards, are optional.

In one embodiment, the inter-connect (131) includes one or more buses connected to one another through various bridges, controllers and/or adapters. In one embodiment the I/O controllers (137) include a USB (Universal Serial Bus) adapter for controlling USB peripherals, and/or an IEEE-1394 bus adapter for controlling IEEE-1394 peripherals.

In one embodiment, the memory (134) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (e.g., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A digital image processing method comprising:
   retrieving by a mobile computing device an object recognition model, wherein the object recognition model comprises one or more object recognition definitions usable to identify within a digital image one or more objects captured by the digital image, the mobile computing device having a collection of computer resources available to process the digital image;
   receiving a first indication from the mobile computing device that there is a first collection of computer resources available, the first collection of computer resources available representing availability of a first collection of computer resources of the mobile computing device required to process object recognition definitions defined in the object recognition model by the mobile computing device;
   determining, based on the first collection of computer resources available to load a first object recognition definition defined in the object recognition model into the first collection of computer resources of the mobile computer device;
   loading into the first collection of computer resources the first object recognition definition;
   analyzing a particular digital image, using the first object recognition definition loaded into the first collection of computer resources to determine whether a first object defined by the first object recognition definition is captured within the particular digital image;
   receiving a second indication from the mobile computing device that there is a second collection of computer resources available, the second collection of computer resources available representing availability of a second collection of computer resources of the mobile computing device required to process object recognition definitions defined in the object recognition model by the mobile computing device;
   determining, based on the second collection of computer resources available to load a second object recognition definition defined in the object recognition model into the second collection of computer resources of the mobile computer device;
   loading into the second collection of computer resources the second object recognition definition;
   analyzing the particular digital image, using the second object recognition definition loaded into the second collection of computer resources to determine whether a second object defined by the second object recognition definition is captured within the particular digital image; and
   associating with the particular digital image, as metadata of the particular digital image, data specifying that the first object or the second object has been captured within the particular digital image.

2. The method of claim 1 wherein the mobile computing device is unable to load all the object recognition definitions included in the object recognition model at a given time.

3. The method of claim 1 wherein the object recognition model is compressed before retrieval by the mobile computing device.

4. The method of claim 1 wherein the determining that the first collection of computer resources is available is in response to receiving the first indication.

5. The method of claim 1 wherein the determining that the first collection of computer resources is available comprises determining that the first collection of computer resources available is insufficient to load the second object recognition definition.

6. The method of claim 1 wherein the object recognition model is loaded onto memory of the mobile computing device before analyzing the particular digital image.

7. The method of claim 1 further comprising:
   transmitting the metadata of the particular digital image to a second computing device;

causing storage at the second computing device that an object has been captured within the particular digital image.

8. The method of claim 1 wherein the first indication that there is a first collection of computer resources available comprises memory, processor bandwidth, or input device for user input.

9. The method of claim 1 wherein the object recognition model comprises output of a machine learning technique based on object recognition data stored separate from the mobile computing device.

10. The method of claim 1 wherein the first indication is received at a first time and the second indication is received at a second time, after the first time.

11. The method of claim 1 wherein the first object defined by the first object recognition definition, but not the second object defined by the second object recognition definition, is captured within the particular digital image, and the method further comprises associating as metadata of the particular digital image that the first object has been captured within the particular digital image.

12. The method of claim 1 wherein the second object defined by the second object recognition definition, but not the first object defined by the first object recognition definition, is captured within the particular digital image, and the method further comprises associating as metadata of the particular digital image that the second object has been captured within the particular digital image.

13. The method of claim 1 wherein the first and second objects defined by the first and second object recognition definitions, respectively, are captured within the particular digital image, and the method further comprises associating as metadata of the digital image that the first and second objects have been captured within the particular digital image.

14. A digital image processing system comprising:
one or more processors;
a non-transitory computer-readable medium having instructions embodied thereon, the instructions, when executed by the one or more processors, cause:
retrieving by a mobile computing device an object recognition model, wherein the object recognition model comprises one or more object recognition definitions usable to identify within a digital image one or more objects captured by the digital image, the mobile computing device having a collection of computer resources available to process the digital image;
receiving a first indication from the mobile computing device that there is a first collection of computer resources available, the first collection of computer resources available representing availability of a first collection of computer resources of the mobile computing device required to process object recognition definitions defined in the object recognition model by the mobile computing device;
determining, based on the first collection of computer resources available to load a first object recognition definition defined in the object recognition model into the first collection of computer resources of the mobile computer device;
loading into the first collection of computer resources the first object recognition definition;
analyzing a particular digital image, using the first object recognition definition loaded into the first collection of computer resources to determine whether a first object defined by the first object recognition definition is captured within the particular digital image;
receiving a second indication from the mobile computing device that there is a second collection of computer resources available, the second collection of computer resources available representing availability of a second collection of computer resources of the mobile computing device required to process object recognition definitions defined in the object recognition model by the mobile computing device;
determining, based on the second collection of computer resources available to load a second object recognition definition defined in the object recognition model into the second collection of computer resources of the mobile computer device;
loading into the second collection of computer resources the second object recognition definition;
analyzing the particular digital image, using the second object recognition definition loaded into the second collection of computer resources to determine whether a second object defined by the second object recognition definition is captured within the particular digital image; and
associating with the particular digital image, as metadata of the particular digital image, that the first object or the second object has been captured within the particular digital image.

15. The system of claim 14 wherein the mobile computing device is unable to load all the object recognition definitions included in the object recognition model at a given time.

16. The system of claim 14 wherein the object recognition model is compressed before retrieval by the mobile computing device.

17. The system of claim 14 wherein the determining that the first collection of computer resources is available is in response to receiving the first indication.

18. The system of claim 14 wherein determining that the first collection of computer resources is available comprises determining that the first collection of computer resources available is insufficient to load the second object recognition definition.

19. The system of claim 14 wherein the second collection of computer resources available was previously unavailable.

20. The system of claim 14 further comprising:
transmitting the metadata of the particular digital image to a second computing device;
causing storage at the second computing device that an object has been captured within the particular digital image.

* * * * *